United States Patent [19]

Nagano

[11] Patent Number: 5,160,878

[45] Date of Patent: Nov. 3, 1992

[54] INDUCTION MOTOR CONTROLLER PROVIDING TEMPERATURE COMPENSATION

[75] Inventor: Tetsuaki Nagano, Aichi, Japan

[73] Assignee: Mitsubishi Denki K.K., Tokyo, Japan

[21] Appl. No.: 625,184

[22] Filed: Dec. 10, 1990

[30] Foreign Application Priority Data

Dec. 21, 1989 [JP] Japan .................................. 1-331751

[51] Int. Cl.$^5$ .............................................. H02P 5/40
[52] U.S. Cl. .................................................... 318/800
[58] Field of Search ......... 318/800, 803, 805, 807–811

[56] References Cited

U.S. PATENT DOCUMENTS 4,442,393 4/1984 Abbondanti .......................... 318/805
4,447,787 5/1984 Schwesig et al. ..................... 318/803

FOREIGN PATENT DOCUMENTS

A117514 9/1984 European Pat. Off. .

OTHER PUBLICATIONS

*Patent Abstracts of Japan,* vol. 8, No. 119 (E-248)(1556) Jun. 5, 1984; JP-A-59 032386, Feb. 21, 1984.
*IECON* 1989, vol. 1, "Self Tuning Vector Control for Induction Motors," S. K. Biswas et al, Nov. 10, 1989, pp. 276–280.

*Primary Examiner*—David Smith
*Attorney, Agent, or Firm*—Sughrue, Mion, Zinn, Macpeak & Seas

[57] ABSTRACT

An induction motor controller which compensates for changes in primary resistance values and secondary resistance values that occur with changes in temperature. Multi-phase current and voltage values are detected at the motor input and converted into primary currents and voltages within an orthogonal system and are used to calculate equivalent and estimated equivalent values of magnetic flux. The flux values are used to generate an estimated value of rotary angular velocity of the induction motor, which is used as a basis for controlling in a feedback manner the generation of the command signals for the motor. The magnetic flux values generated in response to the orthogonal voltage and current values are sensitive to a predetermined primary resistance value and a predetermined secondary resistance value. Circuits for automatically changing the predetermined primary resistance value alone or together with the predetermined secondary resistance value, in response to ones of the flux values, are provided. As a result of compensation for the change in the predetermined resistance values as a function of temperature, accurate control of the angular velocity of the motor can be obtained.

14 Claims, 5 Drawing Sheets

INDUCTION MOTOR CONTROLLER PROVIDING TEMPERATURE COMPENSATION

BACKGROUND OF THE INVENTION

1. Field of the Invention

The present invention relates generally to an induction motor controller and particularly to a controller which allows an accurate estimate of the rotary angular velocity of an induction motor when a primary resistance value or a secondary resistance value of the induction motor is varied due to temperature, using vector control, without a velocity detector.

2. Description of the Background Art

FIG. 9 is a block diagram illustrating an induction motor controller disclosed in the Japanese Patent Disclosure Bulletin No. 1989-043097. In that controller, a three-phase induction motor 1 is connected to receive the output from power amplifier 2 operating under the control of a coordinate converter 3. Coordinate converter 3 converts primary voltage command values $v_d e^*s$ and $v_q e^*s$ (hereinafter, subscripts $d^e$s and $q^e$s represent primary components along $d^e$ and $q^e$ axes) along orthogonal coordinate axes ($d^e$-$q^e$ axes) rotating at a primary circular frequency $\omega$. The power amplifier 2 and the coordinate converter 3 constitute a power feeder. A second coordinate converter 4 operates to convert the three-phase alternating current at the input (i.e., primary currents, $i_u$, $i_v$, $i_w$) into an exciting current component, $i_d e_s$, and a torque current component, $i_q e_s$, primary currents along the $d^e$-$q^3$ axes. A third coordinate converter 5 is operative to convert the three-phase alternating-current voltages at the motor input (i.e., primary voltages, $v_u$, $v_v$, $v_w$) into primary voltages, $v_d e_s$ and $v_q e_s$, along the $d^e$-$q^e$ axes. An equivalent-flux generator 6 operates to generate secondary linkage magnetic flux (SLMF) equivalent values $\lambda' d^e r$, $\lambda' q^e r$ (hereinafter, subscripts $d^e r$ and $q^e r$ represent secondary components along the $d^e$ and $q^e$ axes) in response to the primary voltages. A magnetic flux/slip frequency estimator 7 operates in response to the exciting current component and the torque current component to generate an estimated value, $\hat{\lambda} d^e r$, of the secondary linkage magnetic flux and an estimated value, $\hat{p}\omega_s$, of the slip frequency in a vector-controlled state. A flux estimating device 8 generates estimated values $\hat{\lambda}' d^e r$ and $\hat{\lambda}' q^e r$ of the secondary linkage magnetic flux equivalent amounts. A rotary velocity estimator 9 operates in response to the estimated values from flux estimating device 8 and the equivalent flux generator 6 to generate an estimated value, $\hat{p}\omega_r$, of the rotary angular velocity of the induction motor 1. The value $\omega$ is formed at adder 12 by adding $\hat{p}\omega_r$ and $\hat{p}\omega_s$ and is input to an integrator 10, whose output $\theta$ is provided to a trigonometric function generator 11 whose sine and cosine outputs are provided to converter 5. An adder 12, subtracters 13 and 14, and PI (proportional integral) compensators 15 and 16 complete the circuit.

In operation, the equivalent flux generator 6 receives the primary voltages, $v_d e_s$, $v_q e_s$, the primary currents, $i_d e_s$, $i_q e_s$, and the primary circular frequency, $\omega$, and generates secondary linkage magnetic flux equivalent amounts, $\lambda' d^e r$ and $\lambda' q^e r$, according to matrix expression (1):

$$\begin{bmatrix} \lambda' d^e r \\ \lambda' q^e r \end{bmatrix} = \begin{bmatrix} P + 1/T & -\omega \\ \omega & P + 1/T \end{bmatrix}^{-1} \frac{Lr}{M} \left( \begin{bmatrix} v_d e_S \\ v_q e_S \end{bmatrix} + \begin{bmatrix} -P\sigma Ls - \hat{R}s & \omega\sigma Ls \\ -\omega\sigma Ls & -P\sigma Ls - \hat{R}s \end{bmatrix} \begin{bmatrix} i_d e_s \\ i_q e_s \end{bmatrix} \right) \quad (1)$$

where $\hat{R}s$, $Ls$, $Lr$, $M$ and $\sigma$ are fixed values of the primary resistance, primary inductance, secondary inductance, mutual inductance and the leakage coefficient of the induction motor 1, respectively. Also, P is a differential operator, and T is a time constant of first order lag.

The magnetic flux/slip frequency estimator 7 receives the primary currents, $i_d e_s$, $i_q e_s$, and generates an estimated value, $\hat{\lambda} d^e r$ of the secondary linkage magnetic flux (SLMF) and the estimated value, $\hat{p}\omega_s$, of the slip frequency in the vector-controlled state according to expressions (2) and (3):

$$\hat{\lambda} d^e r = \frac{M\hat{R}r}{Lr(P + \hat{R}r/Lr)} \cdot i_d e_s \quad (2)$$

$$\hat{p}\omega_s = \frac{M\hat{R}r}{Lr} \cdot \frac{i_q e_s}{\hat{\lambda} d^e r} \quad (3)$$

where, $\hat{R}r$ is the fixed value of the secondary resistance of the induction motor 1.

The flux estimating device 8 receives the estimated value, $\hat{\lambda} d^e r$, of the secondary linkage magnetic flux and the primary circular frequency, $\omega$, and generates the estimated values, $\hat{\lambda}' d^e r$ and $\hat{\lambda}' q^e r$, of the secondary linkage magnetic flux equivalent amounts according to matrix expression (4):

$$\begin{bmatrix} \hat{\lambda}' d^e r \\ \hat{\lambda}' q^e r \end{bmatrix} = \begin{bmatrix} P + 1/T & -\omega \\ \omega & P + 1/T \end{bmatrix}^{-1} \begin{bmatrix} P \\ \omega \end{bmatrix} \hat{\lambda} d^e r \quad (4)$$

The rotary angular velocity estimator 9 receives the secondary linkage magnetic flux equivalent amounts, $\lambda' d^e r$, $\lambda' q^e r$, the estimated values $\hat{\lambda}' d^e r$, $\hat{\lambda}' q^e r$, of the secondary linkage magnetic flux equivalent amounts, a fixed secondary resistance value $\hat{R}r$ and the slip frequency estimated value $\hat{p}\omega_s$, and determines the estimated value, $\hat{p}\omega_r$, of the rotary angular velocity of the induction motor 1 according to expression (5):

$$\hat{p}\omega_r = \int_0^t K\{\hat{p}\omega_s(\lambda' d^e r - \hat{\lambda}' d^e r) + (P + \hat{R}r/Lr)(\hat{\lambda}' q^e r - \lambda' q^e r)\}\hat{\lambda} d^e r dt \quad (5)$$

where K is a positive constant.

The adder 12 adds the estimated value, $\hat{p}\omega_r$, of the rotary angular velocity and the estimated value, $\hat{p}\omega_s$, of the slip circular frequency and outputs the primary circular frequency, $\omega$. The integrator 10 integrates the primary circular frequency, $\omega$, and outputs a phase signal, $\theta$. The trigonometric function generator 11 inputs the phase signal $\theta$, and outputs a corresponding sine $\theta$ and a cosine $\theta$ value.

The subtractor 13 and the PI compensator 15 perform feedback control so that the exciting current component, $i_d e_s$, may follow up a command value, $i_d e_s^*$. The subtractor 14 and the PI compensator 16 perform feedback control so that the torque component current, $i_qe_s$, may follow up a command value, $i_qe_s*$.

However, when the actual induction motor is controlled by this induction motor controller, temperatures of the primary resistance value, Rs (where subscript s refers to the stator as the source of resistance), and the secondary resistance value, Rr (where the subscript r refers to the rotor as the source of resistance), of the induction motor vary from 0° C. to about 120° C. in accordance with load state, ambient temperature and other conditions. Assuming that the resistance values center at 60° C., for example, they will vary approximately 20% higher and lower. By omitting the differential term in the steady state, the operational expression of the secondary linkage magnetic flux equivalent amounts, $\lambda'd^e r$, $\lambda'q^e r$, represented by the expression (1) converts into expression (6):

$$\begin{bmatrix} \lambda'd^e r \\ \lambda'q^e r \end{bmatrix} = \begin{bmatrix} 1/T & -\omega \\ \omega & 1/T \end{bmatrix}^{-1} \frac{Lr}{M} \left\{ \begin{bmatrix} vd^eS \\ vq^eS \end{bmatrix} + \begin{bmatrix} -\hat{R}s & \omega\sigma Ls \\ -\omega\sigma Ls & -Rs \end{bmatrix} \begin{bmatrix} id^e s \\ iq^e s \end{bmatrix} \right\} \quad (6)$$

By ignoring the differential term, the estimated value, $p\omega_s$, of the slip circular frequency in the steady state, according to expressions (2) and (3), converts into expression (7):

$$\hat{p}\omega_s = \frac{\hat{R}r}{Lr} \cdot \frac{iq^e s}{id^e s} \quad (7)$$

Since expression (6) includes a fixed primary resistance value $\hat{R}r$, and expression (7) includes a fixed secondary resistance value, $\hat{R}r$, if an error occurs due to temperature variations between the fixed primary and secondary resistance values, $\hat{R}s$, $\hat{R}r$, and the actual primary and secondary resistance values, Rs, Rr, of the induction motor 1, the operational accuracy of the secondary linkage magnetic flux equivalents $\lambda'd^e r$, $\lambda'q^e r$, and the estimated value, $\hat{p}\omega_s$, of the slip frequency is lowered. Further, in expression (6), since $|\omega\sigma Ls|$ becomes less than the fixed primary resistance value, $\hat{R}s$, in a low velocity range, the error in the primary resistance value, Rs, has greater influence on the secondary linkage magnetic flux equivalent amounts, $\lambda'd^e r$, $\lambda'q^e r$. Therefore, since the rotary angular velocity estimator 9 calculates its values using expression (5), which includes the secondary linkage magnetic flux equivalent amounts, $\lambda'd^e r$, $\lambda'q^e r$, the estimated value $\hat{p}\omega_s$ of the slip frequency and the fixed secondary resistance value $\hat{R}r$, an estimation error, especially large in the low velocity range, occurs in the estimated value $\hat{p}\omega_r$ of rotary angular velocity. The error is due to the variations of the primary resistance value Rs and the secondary resistance value Rr according to temperature, resulting in unstable control.

It is, accordingly, an object of the present invention to overcome the disadvantages in the above system by providing an induction motor controller that will allow an accurate estimation of the rotary angular velocity of the induction motor regardless of any variation in the primary resistance value or the secondary resistance value of the induction motor with temperature.

It is a further object of the present invention to provide an induction motor controller that will allow an accurate estimation of rotary angular velocity at low motor speeds.

SUMMARY OF THE INVENTION

The foregoing objects are accomplished by providing an induction motor controller comprising: an equivalent amount generation means for generating amounts equivalent to the secondary linkage magnetic flux of an induction motor having a vector in the same direction as a torque current component of the primary current supplied to the said induction motor; an estimated value generation means for generating estimated values of amounts equivalent to the secondary linkage magnetic flux of the induction motor; and a primary resistance setting means for compensating for a predetermined, fixed primary resistance value of the induction motor in accordance with a difference between the output of the equivalent amount generation means and the output of the estimated value generating means. The primary resistance setting means changes the polarity of the difference between the output of the equivalent amount generation means and the output of the estimated value generating means in correspondence with the polarity of the primary circular frequency of the induction motor and then outputs that result via a compensating element. The primary resistance setting means is operative to stop the primary resistance setting operation and hold and output the resistance value at the time of stoppage if the absolute value of the primary circular frequency or an estimated rotary angular velocity value of the induction motor is equal to or greater than a predetermined value. A secondary resistance setting means also may be used for compensating for the predetermined fixed secondary resistance value of the induction motor in accordance with an output of the primary resistance setting means, the secondary resistance setting means outputting a compensation amount obtained by multiplying the output of the primary resistance setting means by a predetermined constant.

According to the present invention, the equivalent amount generation means generates amounts equivalent to the secondary linkage magnetic flux of the induction motor having a vector in the same direction as the torque current component of the primary current supplied to the induction motor, and the estimated value generation means generates estimated values of amounts equivalent to the secondary linkage magnetic flux of the induction motor. The primary resistance setting means compensates for the predetermined fixed primary resistance value of the induction motor in accordance with the difference between the output of the equivalent amount generation means and the output of the estimated value generation means to match the resistance set value with the actual primary resistance value of the induction motor.

The primary resistance setting means can stop the primary resistance setting operation and provide the output of the primary resistance setting means at the time of such stoppage if an absolute value of the primary circular frequency or an estimated rotary angular velocity value of the induction motor is equal to or greater than a predetermined value. This feature avoids the compensating operation in a range where the variation of the primary resistance value of the induction motor due to temperature may be ignored. The secondary resistance setting means for compensating for the predetermined fixed secondary resistance value of the induction motor in accordance with the output of the primary resistance setting means matches the fixed secondary resistance value with the secondary resistance value of the induction motor.

DESCRIPTION OF THE PREFERRED EMBODIMENTS

Figure 1:
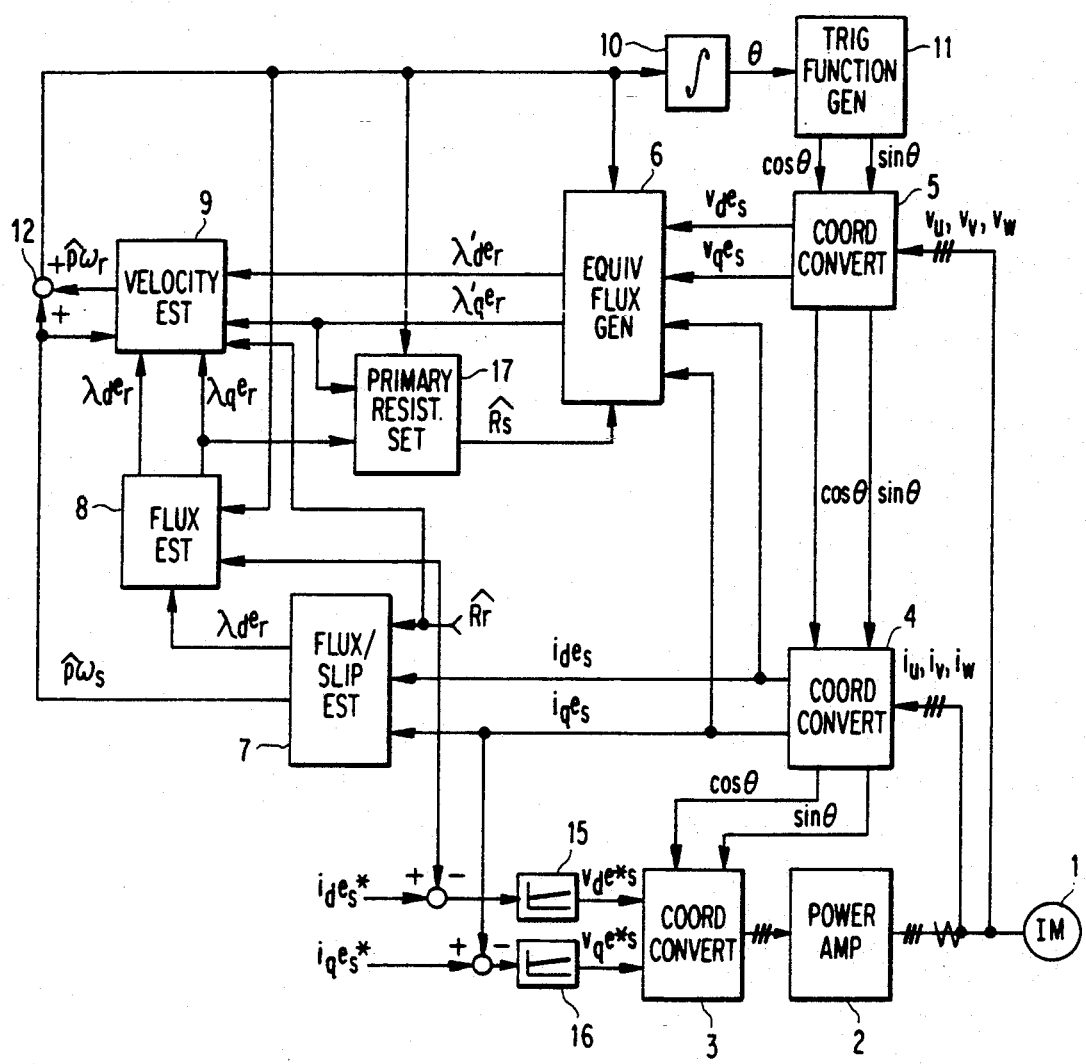
FIG. 1 is a block diagram illustrating an induction motor controller according to one embodiment of the present invention.
Figure 9:
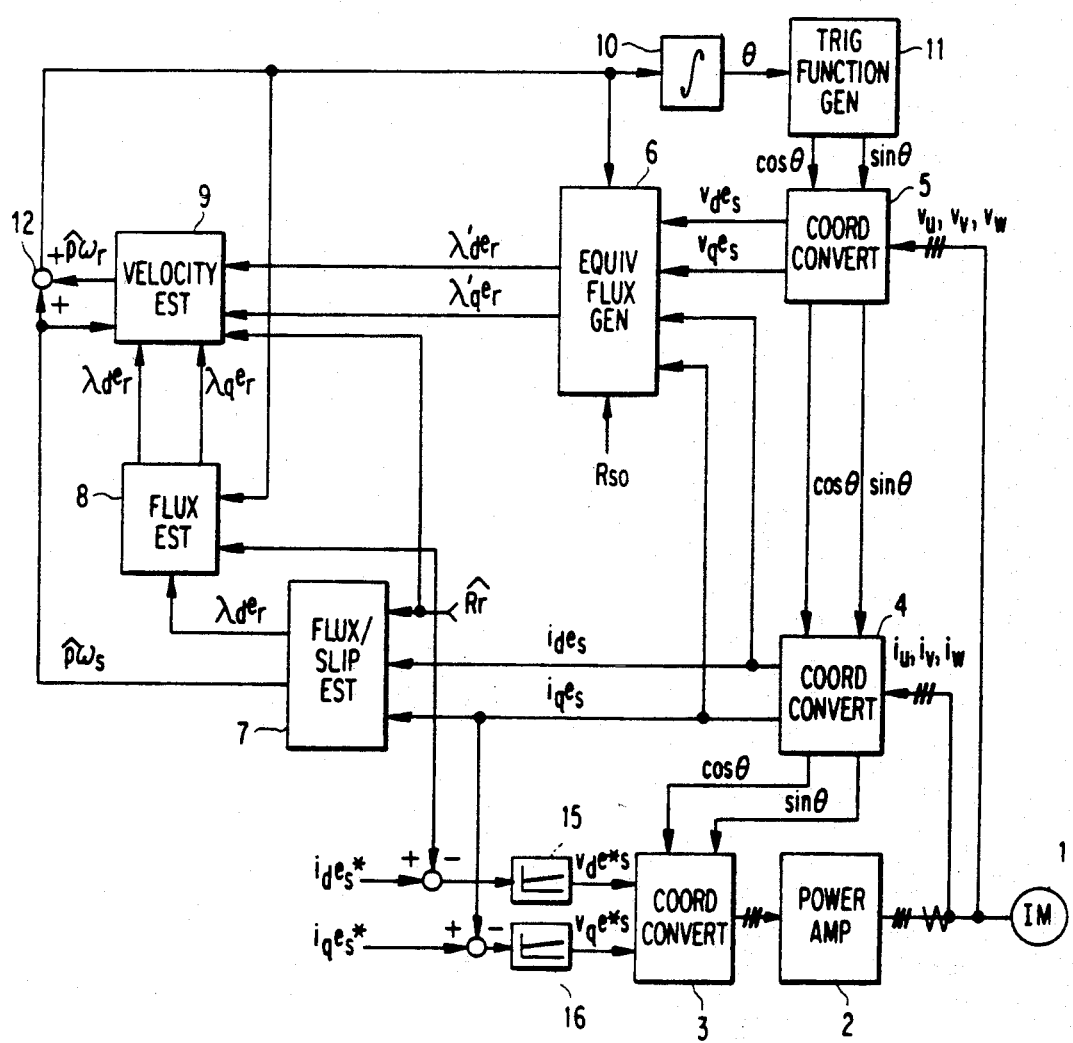
FIG. 9 is a block diagram illustrating another induction motor controller as background for a discussion of the invention.

Illustrated in FIG. 1 is a block diagram showing an induction motor controller according to one embodiment of the present invention. Like reference characters in FIG. 1 and FIG. 9 identify like parts, which will not be again described here. However, FIG. 1 further includes a primary resistance setting device 17, which receives inputs from SLMF estimator 8, SLMF equivalent generator 6 and adder 12 to generate a set primary resistance value $\hat{R}_s$.

Figure 2:
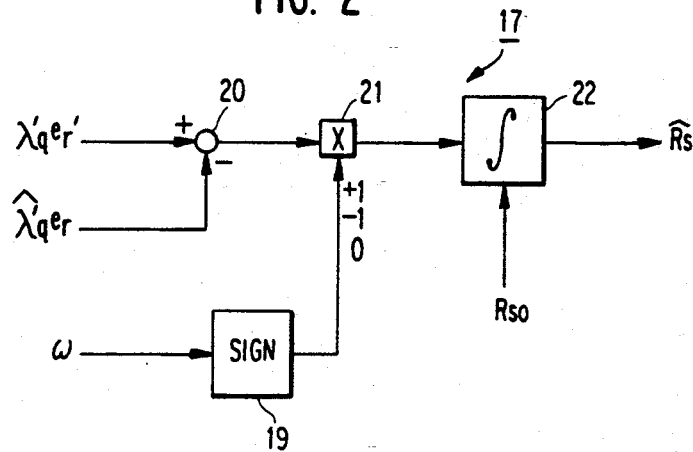
FIG. 2 is a block diagram illustrating a detailed circuit of a primary resistance setting device shown in FIG. 1.

FIG. 2 is a block diagram illustrating a detailed circuit of the primary resistance setting device 17, wherein a comparator 19 judges the sign of the primary circular frequency, $\omega$, and outputs $-1$ for a positive frequency and $+1$ for a negative frequency and zero if it is zero. A subtracter 20 receives the outputs from SLMF estimator 8 and SLMF equivalent generator 6, inputs the difference to a multiplier 21 which also receives the sign of frequency signal $\omega$ and provides its output to an integrator 22 acting as a compensating element. Integrator 22 also receives Rso, an initial value for the integrator 22. If the output of multiplier 21 is negative, $\hat{R}_s$ will be reduced and if the output is positive, $\hat{R}_s$ will be increased.

In operation, a relationship exists among secondary linkage magnetic flux equivalent amounts, $\lambda'd^e r$, $\lambda'q^e r$, and estimated values, $\hat{\lambda}'d^e r$, $\hat{\lambda}'q^e r$, of the secondary linkage magnetic flux equivalent amounts. There is a difference between components having the same vector as the torque component current, $i_q e_s$, i.e., $\hat{\lambda}'q^e r$. That difference has a relationship with respect to $Rs - \hat{R}s$, as indicated by expression (8), in a steady state if the a primary resistance set value, $\hat{R}s$, does not match the actual primary resistance value, $Rs$, of the induction motor 1.

$$\lambda'q^e r - \hat{\lambda}'q^e r = \frac{M}{2Lr} i d^e s \left[ \frac{-1 \pm a}{\omega}(\hat{R}s - Rs) + \frac{M^2}{Lr^2}\left[ \mp 1 + \frac{Rr/Lr}{p\omega_s^2 + Rr^2/Lr^2}\left((-1 \pm a)p\omega_s + (\pm 1 + a)\frac{Rr}{Lr}\right)\right]\right] \quad (8)$$

where
$a = iq^e s / id^e s$

In this equation, the upper sign of ($\pm$ or $\mp$) is used if $\omega > 0$, and the lower sign is used if $\omega < 0$.

In the equation, $p\omega_s$ is the actual slip frequency and is given as the solution of the equation in expression (9):

$$\left\{(1 \mp 2a - a^2)(Rs - \hat{R}s) + (\pm 1 + a)\frac{\omega M^2}{Lr}\right\}p\omega_s^2 (1 \mp 2a - a^2)\frac{\omega M^2 Rr}{Lr^2} p\omega_s + \left\{(1 \mp 2a - a^2)(Rs - \hat{R}s) + (-a \pm a^2)\frac{\omega M^2}{Lr}\right\}\frac{Rr^2}{Lr^2} = 0 \quad (9)$$

where the upper sign of ($\pm$ or $\mp$) is used if $\omega > 0$, and the lower sign is used if $\omega < 0$.

Figure 3A:
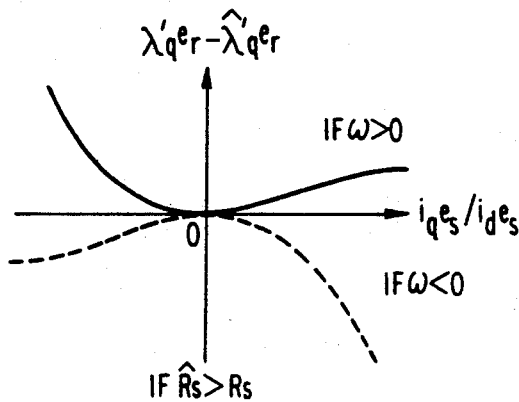
FIGS. 3(a) and 3(b) are diagrams illustrating the relationship between motor current and magnetic flux values where a fixed primary resistance set value does not match an actual primary resistance value.
Figure 3B:
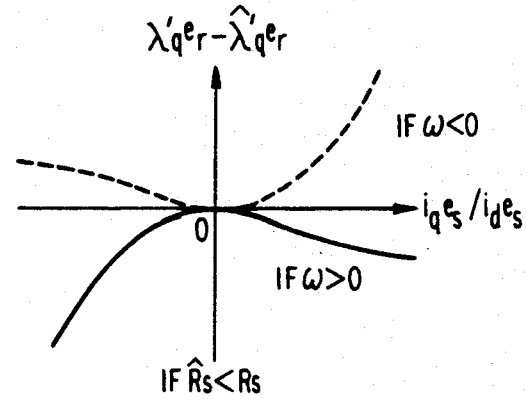

FIGS. 3(a) and 3(b) indicate a relationship between $i_q e_s/i_d e_s$ and $\lambda'q^e r - \hat{\lambda}'q^e r$ when the primary circular frequency, $\omega$, is controlled to be constant if the fixed primary resistance value, $\hat{R}s$, does not match the actual primary resistance value, $Rs$. FIG. 3(a) shows the case when $\hat{R}s > Rs$ and FIG. 3(b) shows the case where $\hat{R}s < Rs$. As seen from FIGS. 3(a) and 3(b), when the fixed primary resistance value, $\hat{R}s$, is adjusted by means of the primary resistance setting device 17 and sets to zero the quantity $\hat{\lambda}'q^e r - \lambda'q^e r$, the fixed primary resistance value, $\hat{R}s$, matches the actual primary resistance value, $Rs$, of the induction motor 1. In this manner, the secondary linkage magnetic flux equivalent amounts, $\lambda'q^e r$, $\lambda'q^e r$, can be accurately generated.

From FIGS. 3(a) and 3(b) and as seen in the operation of FIG. 2, correction algorithms for the primary resistance set value, $\hat{R}s$, may specifically be designed to:

i) Decrease $\hat{R}s$ if $\omega > 0$ and $(\lambda'q^e r - \lambda'q^e r) > 0$.
ii) Increase $\hat{R}s$ if $\omega > 0$ and $(\lambda'q^e r - \lambda'q^e e) < 0$.
iii) Increase $\hat{R}s$ if $\omega < 0$ and $(\lambda'q^e r - \lambda'q'r) > 0$.
iv) Decrease $\hat{R}s$ if $\omega < 0$ and $(\lambda'q^e r - \lambda'q^e r) < 0$.

Hence, by inputting (i) the secondary linkage magnetic flux equivalent amount, $\lambda'q^e r$, i.e., an output of the SLMF equivalent generator 6, (ii) the estimated value, $\hat{\lambda}'q^e r$, of the secondary linkage magnetic flux equivalent amount, i.e., an output of the SLMF estimator 8, and (iii) the primary circular frequency, $\omega$, into the primary resistance setting device 17 and operating upon these values in accordance with the above algorithms (i)–(iv), the primary resistance setting device 17 can provide the SLMF equivalent generator 6 with a fixed primary resistance value, $\hat{R}s$, that matches the actual primary resistance value, $Rs$, of the induction motor 1. A circuit having the block diagram shown in FIG. 2 is used to execute the algorithms. In that circuit, an output of the multiplier 21 is obtained by changing the polarity of the output, $\lambda'q^e r - \hat{\lambda}'q^e r$, of the subtracter 20 in accordance with the sign of the primary circular frequency, $\omega$.

Figure 4A:
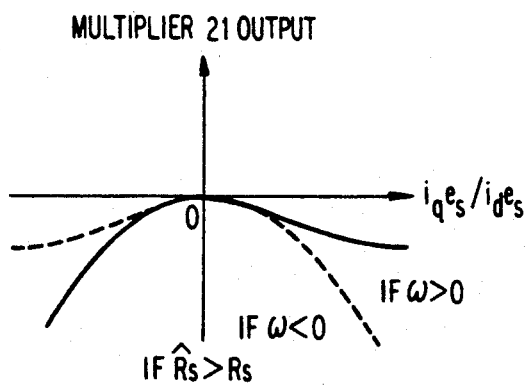
FIGS. 4(a) and 4(b) are diagrams illustrating the relationships between the parameters shown in FIG. 3 when they are converted in accordance with the polarity of a primary circular frequency.
Figure 4B:
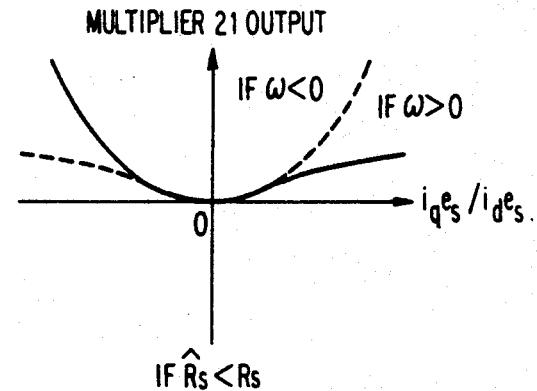

The characteristics of the multiplier 21 output are shown in FIGS. 4(a) and 4(b). In particular, as seen in FIG. 4(b), the output of the multiplier 21 is positive if the primary resistance set value, $\hat{R}s$, is less than the primary resistance value, $Rs$, of the induction motor 1. As seen in FIG. 4(a), the output is negative if the primary resistance set value, $\hat{R}s$, is greater than the primary resistance value, $Rs$. When the output of the multiplier 21 is received by integrator 22 and the output of the integrator 22 is used as the primary resistance set value, $\hat{R}s$, the integrator 22 operates to increase the primary resistance set value, $\hat{R}s$, if it is smaller than the primary resistance value, $Rs$, and reduce it if it is larger than the primary resistance value, $Rs$. Thus, since the existence of a difference and its sign is readily determined, the primary resistance set value, $\hat{R}s$, is easily made to match the primary resistance value, $Rs$, of the induction motor 1. In the above embodiment, it will be recognized that any device including an integrating operation, e.g., a proportional integrator, having in parallel paths an integrator and a proportional constant, may be used in place of the integrator 22.

Figure 5:
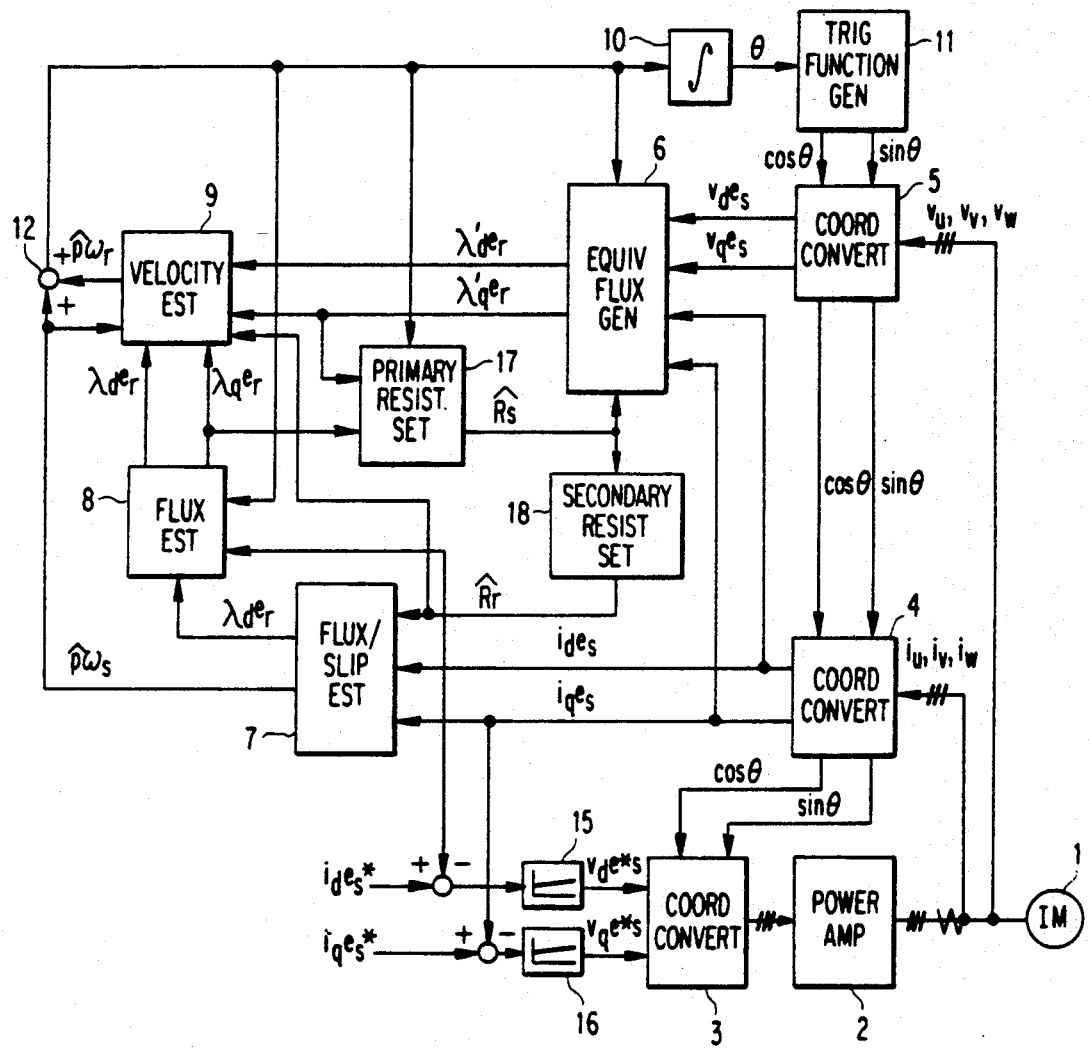
FIG. 5 is a block diagram illustrating an induction motor controller according to an alternate embodiment of the present invention.

FIG. 5 is a block diagram illustrating an induction motor controller according to an alternate embodiment of the present invention, wherein a secondary resistance setting device 18 is added. Since identical reference characters in FIG. 1 and FIG. 5 indicate identical parts, these will not be described again here.

Figure 6:
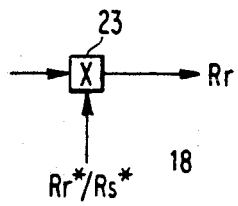
FIG. 6 is a block diagram illustrating a detailed circuit of a secondary resistance setting device shown in FIG. 5.

FIG. 6 is a block diagram showing detailed circuitry Of the secondary resistance setting device 18, wherein a multiplier 23 is employed.

Operation will now be described with reference to FIGS. 5 and 6. Correction of the primary resistance set value, $\hat{R}s$, need not be described because it is identical to that of the foregoing operation.

The primary resistance value, $Rs$, and the secondary resistance value, $Rr$, of the induction motor 1 may be represented by expressions 10 and 11, assuming that their values at a certain reference temperature $t^*$ (°C.) are $Rs^*$ and $Rr^*$:

$$Rs \approx \{1 + \alpha(t_1 - t^*)\}Rs^* \quad (10)$$

$$Rr \approx \{1\alpha(t_2 - t^*)\}Rr^* \quad (11)$$

where, $t_1$ (°C.) is the temperature of the primary resistance value, $Rs$, $t_2$ (°C.) is the temperature of the secondary resistance value, $Rr$, and $\alpha$ (1/°C.) is the temperature coefficient of the resistivity of the (primary or secondary) resistance. In these equations, is a constant related to the conductive material. Considering that $t_1$ and $t_2$ are almost equal, the relationship in expression (12) is established from expressions (10) and (11) between the primary resistance value, $Rs$, and the secondary resistance value, $Rr$:

$$Rr \approx \frac{Rr^*}{Rs^*} Rs \quad (12)$$

Hence, by generating a secondary resistance set value, $\hat{R}r$, according to expression (12) using the primary resistance set value, $\hat{R}s$, i.e., the output of the primary resistance setting device 17, the secondary resistance set value, $\hat{R}r$, will approximately match the secondary resistance value, $Rr$, of the induction motor 1 and the generation of the slip frequency can be performed accurately.

This operation is executed in element 18 as shown in FIG. 6. Namely, the multiplier 23 receives the primary resistance set value, $\hat{R}s$, i.e., the output of the primary resistance setting device 17, multiplies it by a constant, $Rr^*/Rs^*$, indicated in expression (12), and outputs the result as the secondary resistance set value, $\hat{R}r$.

Figure 7:
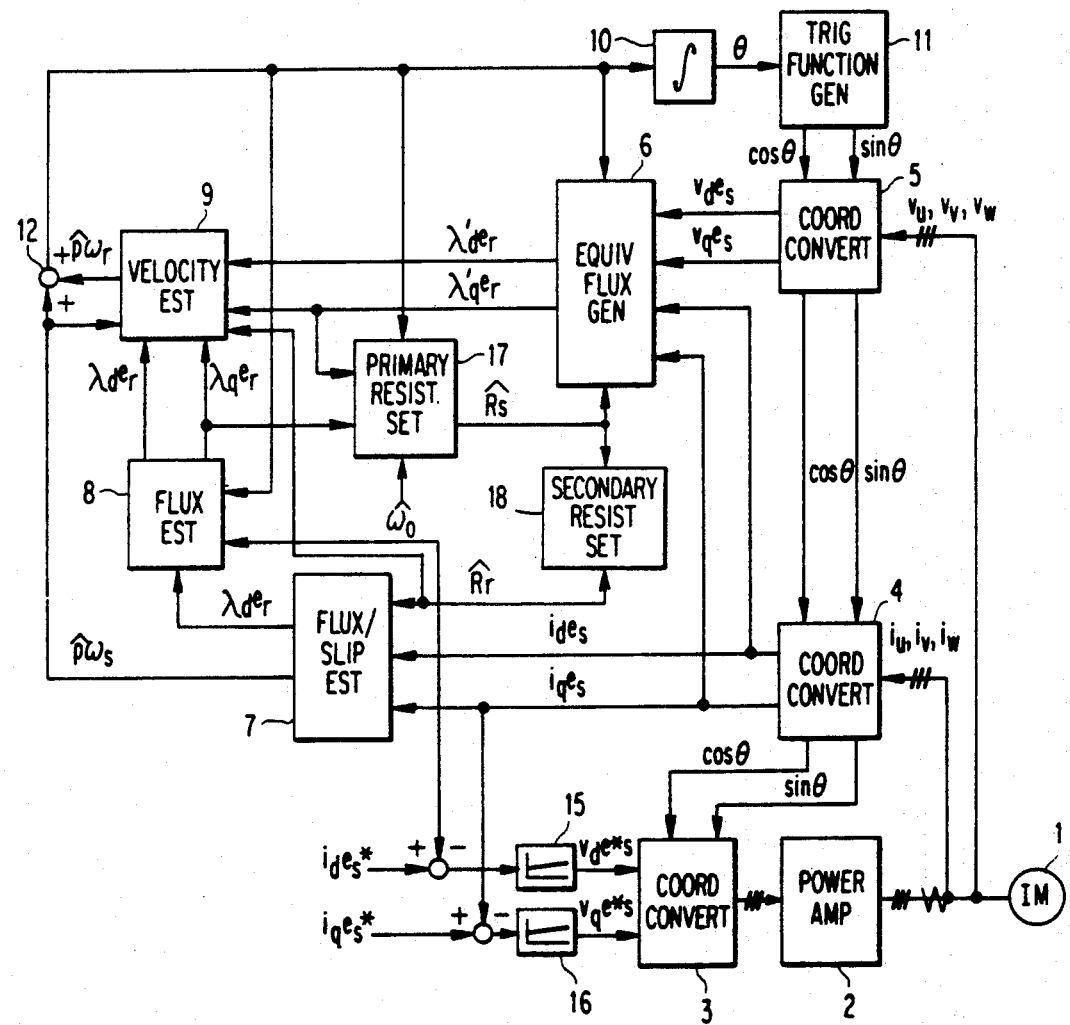
FIG. 7 is a block diagram illustrating an induction motor controller according to a further alternate embodiment of the present invention.

FIG. 7 is a block diagram showing an induction motor controller according to a further alternate embodiment of the present invention, wherein the numeral 24 indicates a primary resistance setting device. Again, like reference characters in FIG. 7 and FIG. 5 identify like parts, and will not be described here.

Figure 8:
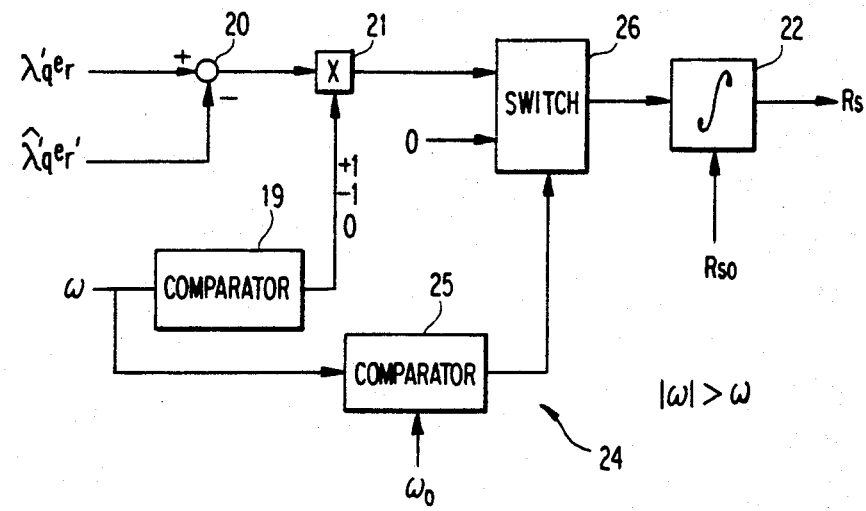
FIG. 8 is a block diagram illustrating a detailed circuit of a primary resistance setting device shown in FIG. 7.

FIG. 8 is a block diagram illustrating the detailed circuitry of the primary resistance setting device 24, wherein a switch 26 is used. Identical reference characters in FIG. 8 and FIG. 2 designate identical parts.

The operation of the third embodiment may be described with reference to FIGS. 7 and 8. It should be noted initially that in expression (6), as previously described, $|\omega\sigma Ls|$ becomes substantially greater than the primary resistance set value, $\hat{R}s$, if the absolute value, $|\omega|$, of the primary circular frequency, $\omega$, becomes larger. In that case, the primary resistance set value, $\hat{R}s$, need not be corrected if $|\omega|$ has reached or exceeded a certain value because the variations of the primary resistance due to temperature have almost no influence on the operational accuracy of the secondary linkage magnetic flux equivalents, $\lambda'd^e r$, $\lambda'q^e r$.

Referring to FIG. 7, the primary resistance setting device 24 operates like the primary resistance setting device 17 shown in FIG. 1 if $|\omega|$ is smaller than a preset value, ($\omega o > 0$), and stops the operation and holds the output at the time the operation is stopped if $|\omega|$ is equal to or larger than $\omega o$. Specifically, as seen in FIG. 8, the comparator 25 compares the absolute value, $|\omega|$, of the primary circular frequency, $\omega$, with the set value, $\omega o$, and sends an operating signal to the switch 26 if $|\omega|$ is equal to or larger than $\omega o$. The switch 26 thus outputs zero if a signal is outputted by the comparator 25, and provides the output of the multiplier 21 if a signal is not output by comparator 25. Therefore, if the absolute value, $|\omega|$, of the primary circular frequency, $\omega$, reaches or exceeds the set value, $\omega o$, the integrator 22 stops its integrating operation and retains the output at the time the operation is stopped.

It will be appreciated that a comparison by the comparator 25 may be made between the absolute value, $|p\omega_r|$ of the estimated value, $\hat{p}\omega_r$, of the rotary angular velocity and the set value, $\omega o$ instead of between the absolute value, $|\omega|$ of the primary circular frequency, $\omega$, and the set value, $\omega o$.

It will be apparent that the invention, as described above, achieves an induction motor controller that will allow accurate estimation of the rotary angular velocity of an induction motor by matching a primary resistance set value with an actual primary resistance value of the induction motor. This accurate operation occurs because the controller uses an equivalent amount generator to generate a value equivalent to the secondary linkage magnetic flux of the induction motor having a vector in the same direction as a torque component of a primary current supplied to the induction motor. An estimated value generator for generating estimated values of the equivalent to the secondary linkage magnetic flux of the induction motor is also used. Further used is a primary resistance value that compensates for the predetermined primary resistance of the induction motor in accordance with the difference between an output of an equivalent amount generator and that of an estimated value generator.

It will also be apparent that the present invention will provide an induction motor controller which will ensure accurate estimation of the rotary angular velocity of the induction motor because the primary resistance setting circuit changes the polarity of the difference between the operation result of the equivalent amount generator and that of the estimated value generator in correspondence with the polarity of the primary circular frequency of the induction motor and then outputs that result via a compensating element.

It will further be apparent that the present invention will provide an induction motor controller which will allow accurate estimation of the rotary angular velocity to be selectively performed as necessary because the primary resistance setting circuit stops the primary resistance setting operation and holds the output of the primary resistance at the time the operation is stopped if an absolute value of the primary circular frequency or a rotary angular velocity estimated value of the induction motor is equal to or greater than a predetermined value.

It will further be apparent that the present invention will provide an induction motor controller that will allow estimation of the rotary angular velocity to be performed more accurately by matching a derived primary resistance value with an actual primary resistance value of the induction motor and further by matching a derived secondary resistance value with an actual secondary resistance value. The controller is equipped with a secondary resistance setting element for compensating the preset secondary resistance value of the induction motor in accordance with an output of the primary resistance setting circuit.

While the present invention has been described in accordance with preferred embodiments, the scope of the invention is not limited thereto and is defined in accordance with the claims appended hereto.

What is claimed is:

1. An induction motor controller comprising:
   equivalent flux generating means responsive to a set primary resistance value and operative to determine an amount of flux equivalent to a secondary linkage magnetic flux of an induction motor having a vector in the same direction as a torque component of a primary current supplied to said induction motor;
   estimated flux generating means for estimating values of the amounts of flux equivalent to the secondary linkage magnetic flux of said induction motor; and
   primary resistance setting means for modifying said set primary resistance value of said induction motor in accordance with a difference between the output of said equivalent flux generating means and the output of said estimated flux generating means.

2. The induction motor controller according to claim 1, further comprising:
   a compensating element connected to said primary resistance setting means,
   means for determining the polarity of a primary circular frequency of said induction motor;
   said primary resistance setting means being operative to change a polarity of the difference between the output of the equivalent flux generating means and the output of the estimated flux generating means in accordance with the polarity of a primary circular frequency of said induction motor and to output said result via said compensating element.

3. The induction motor controller according to claim 1, further comprising means for determining the magnitude of a primary circular frequency of said induction motor;
   said primary resistance setting means being responsive to said determining means and operative to modify said set primary resistance value only when the magnitude of the primary circular frequency of said induction motor is below a predetermined threshold.

4. The induction motor controller of claim 3, wherein said primary resistance setting means is operative to store a prior modified primary resistance value and to output said prior value when said primary circular frequency is above said predetermined threshold.

5. The induction motor controller according to any one of claims 1, 2, 3 or 4, further comprising: a secondary resistance setting means for compensating for a preset secondary resistance value of said induction motor in accordance with a modified primary resistance output of said primary resistance setting means.

6. The induction motor controller according to claim 5, wherein said secondary resistance setting means outputs a compensation amount obtained by multiplying the output of said primary resistance setting means by a predetermined constant.

7. The induction motor controller according to claim 1, wherein said primary resistance setting means is operative to modify said set primary resistance value only when the absolute value of the estimated value of the rotary angular velocity is below a predetermined threshold.

8. The induction motor controller according to claim 7, wherein said primary resistance setting means is operative to store a prior modified primary resistance value and to output said prior value when said primary circular velocity is above said predetermined threshold.

9. A controller for an induction motor operative in response to a three-phase input, comprising:
   first conversion means for converting said three-phase input into orthogonal voltage and current values, equivalent flux generating means responsive to said orthogonal voltage and current values for generating flux amounts equivalent to a secondary linkage magnetic flux of said motor,
   estimated flux generating means responsive to said orthogonal current values and a secondary resistance value for generating an estimated value of the equivalent secondary linkage magnetic flux,
   means responsive to said flux estimating means and said equivalent flux generating means for generating an estimated value of rotary angular velocity, and primary resistance setting means responsive to i) said equivalent flux generating means, ii) said estimated flux generating means and iii) said primary circular frequency value for generating a primary resistance value that substantially matches the actual primary resistance value of the induction motor, said primary resistance value being input to said equivalent flux generating means.

10. A method of providing dynamic vector control of an induction motor operative in response to a three-phase input, comprising:

converting said three-phase input into orthogonal current and orthogonal voltage values, respectively;

generating equivalent secondary linkage magnetic flux values in response to said orthogonal voltage and orthogonal current values, and a primary resistance value of said induction motor;

generating estimates of secondary linkage magnetic flux responsive to at least said orthogonal current values;

generating an estimate of rotary angular velocity of the motor in response to at least said estimated value of equivalent secondary linkage magnetic flux and said equivalent secondary linkage magnetic flux; and generating a modified predetermined primary resistance value in response to at least one of a secondary linkage magnetic flux equivalent value and an estimated value of equivalent secondary linkage magnetic flux and subsequently using said modified value in the generation of said equivalent flux value.

11. The method of claim 10, further comprising the steps of:

determining the difference between said equivalent secondary magnetic flux and said estimated equivalent secondary magnetic flux, judging the polarity of a primary circular frequency of said induction motor, modifying said difference on the basis of said detected polarity, and modifying said primary resistance value in response to said modified difference value.

12. The method of claim 11, wherein said difference value is provided with a sign on the basis of said polarity judging step.

13. The method of claim 11 further comprising generating a secondary resistance value in response to said modified primary resistance value and modifying an estimated value of the rotary angular velocity and an estimated value of slip circular frequency on the basis of said secondary resistance value.

14. The method of claim 11, further comprising the steps of:

detecting whether the rotary angular velocity value or primary angular frequency is equal to or greater than a predetermined value and, if greater, stopping said primary resistance modifying operation and holding and outputting the output of said operation at the said operation was stopped.

* * * * *